US009245503B2

(12) United States Patent
Allen

(10) Patent No.: US 9,245,503 B2
(45) Date of Patent: Jan. 26, 2016

(54) MUSICAL PERCUSSION SUPPORT STANDS AND RELATED DEVICES AND METHODS

(71) Applicant: Conn-Selmer, Inc., Elkhart, IN (US)

(72) Inventor: Joshua Allen, Portage, MI (US)

(73) Assignee: Conn-Selmer, Inc., Elkhart, IN (US)

( * ) Notice: Subject to any disclaimer, the term of this patent is extended or adjusted under 35 U.S.C. 154(b) by 49 days.

(21) Appl. No.: 14/355,098

(22) PCT Filed: Nov. 26, 2012

(86) PCT No.: PCT/US2012/066522
§ 371 (c)(1),
(2) Date: Apr. 29, 2014

(87) PCT Pub. No.: WO2013/081965
PCT Pub. Date: Jun. 6, 2013

(65) Prior Publication Data

US 2014/0311319 A1 Oct. 23, 2014

Related U.S. Application Data

(60) Provisional application No. 61/564,904, filed on Nov. 30, 2011.

(51) Int. Cl.
*G10D 13/02* (2006.01)
*F16M 11/38* (2006.01)

(52) U.S. Cl.
CPC .................................... *G10D 13/026* (2013.01)

(58) Field of Classification Search
USPC ............................................................ 84/421
See application file for complete search history.

(56) References Cited

U.S. PATENT DOCUMENTS

| | | | | |
|---|---|---|---|---|
| 3,405,587 A | | 10/1968 | Meazzi et al. | |
| 4,497,125 A | | 2/1985 | Hutchinson | |
| 4,986,158 A | * | 1/1991 | Johnson ................. | F16M 11/00 84/327 |
| 6,031,170 A | | 2/2000 | Hoshino | |
| 6,437,225 B1 | | 8/2002 | Shigenaga | |
| 7,484,558 B2 | * | 2/2009 | Wood .................... | E21B 15/006 166/75.14 |
| 7,514,619 B1 | * | 4/2009 | Bruce .................... | A47B 81/00 100/100 |

OTHER PUBLICATIONS

International Search Report; PCT/US2012/066522; Feb. 5, 2013; 2 pp.
Written Opinion; PCT/US2012/066522; Feb. 5, 2013; 6 pp.

* cited by examiner

*Primary Examiner* — Christopher Uhlir
(74) *Attorney, Agent, or Firm* — Fish & Richardson P.C.

(57) ABSTRACT

In some aspects, a musical percussion support stand includes a stand tube, legs that are configured to be deployed perpendicular to the stand tube in supporting arrangement and a set of two or more height adjustable foot elements. The height adjustable foot elements include a body with at least one rest surface and a first recess. The first recess is configured to receive a leg, with a central axis of the first recess substantially parallel to a horizontal central axis of the body. The body has a first position and a second position relative to a central axis of the leg. In the first position, the rest surface may be disposed on a supporting surface for supporting the stand, with the leg relatively more spaced above the supporting surface than in the second position.

16 Claims, 6 Drawing Sheets

MUSICAL PERCUSSION SUPPORT STANDS AND RELATED DEVICES AND METHODS

CROSS-REFERENCE TO RELATED APPLICATIONS

This application is a U.S. National Phase Application of International Patent Application No. PCT/US2012/066522 filed Nov. 26, 2012, which claims the benefit of U.S. Provisional Patent Application No. 61/564,904, filed Nov. 30, 2011, the contents of both of which are incorporated by reference herein in their entirety.

TECHNICAL FIELD

This disclosure relates to musical percussion support stands, and to related devices and methods.

BACKGROUND

Different types of support stands are used to support and position various pieces of musical equipment during use. In the field of percussion equipment, particularly relating to setting up various components forming a drum set, a drummer may desire to position some of the components, such as cymbals, very close to one another. Certain conventional stands (e.g., so-called "flat" stands) are supported on three legs that, when deployed, can lay substantially flat along a ground or floor surface. Flat stands are recognized to permit less flexibility with regards to positioning, as the legs have a greater tendency to interfere with each other.

SUMMARY

In some aspects of the disclosure, a musical percussion support stand includes a stand tube, two or more legs that are pivotally secured to a lower portion of the stand tube and configured to be deployed generally perpendicular to the stand tube in supporting relationship, and a set of at least two height adjustable foot elements. Each height adjustable foot element includes a body defining at least one rest surface and at least a first recess defined by the body. The first recess is configured to receive an endward region of one of the legs and a central axis of the first recess is substantially parallel to a horizontal central axis of the body. The body has a first position relative to a central axis of the leg, wherein the at least one rest surface is disposed for supporting engagement of the stand upon a supporting surface. The body also has a second position relative to the central axis of the leg. In the first position of the body relative to the central axis of the leg, the leg is relatively more spaced from the supporting surface than in the second position of the body relative to the central axis of the leg.

Implementations of the disclosure can include one or more of the following features. The first recess is offset in the vertical direction from the horizontal central axis of the body by a distance removing the first recess from intersection with the horizontal central axis of the body. The body defines a second recess that is positioned opposite the first recess with respect to a horizontal plane that passes through the horizontal central axis, the second recess being configured to alternatively receive the leg and orient the body in the second position relative to the central axis of the leg. The height adjustable foot element is axially removable from the leg. The at least one rest surface is a first rest surface, the body further defines a second rest surface, and in the second position of the body relative to the central axis of the leg, the second rest surface is disposed for supporting engagement of the stand upon a support surface. The height adjustable foot element is rotatable about the central axis of the leg.

In some implementations, the support stand includes a pivot member pivotally mounting the body to the leg, wherein the body can pivot with respect to the leg between at least the first position of the body relative to the central axis of the leg and the second position of the body relative to the central axis of the leg. In the second position of the body relative to the central axis of the leg, the second rest surface is disposed for supporting engagement upon the support surface. Each leg includes a fixed foot element extending from a lower surface of the leg that defines a foot surface. In the first position of the body relative to the leg, the rest surface of the body is disposed in supporting engagement of the stand upon the supporting surface and the foot surface of the fixed foot element is removed from contact with the supporting surface. In the second position of the body relative to the leg, the rest surface of the body is removed from contact with the supporting surface and the foot surface of the of the fixed foot element is disposed in supporting engagement of the stand upon the supporting surface.

In another aspect of the disclosure, a height adjustable foot element includes a body defining at least one rest surface and at least a first recess defined by the body. The first recess is configured to receive a beam-like leg member and a central axis of the first recess is substantially parallel to a horizontal central axis of the body. The body has a first position relative to a central axis of the beam-like leg member, wherein the at least one rest surface is disposed for supporting engagement upon a supporting surface. The body has a second position relative to the central axis of the beam-like leg member. In the first position of the body relative to the central axis of the beam-like leg member, the beam-like leg member is relatively more spaced above the supporting surface than in the second position of the body relative to the beam-like leg member.

Implementations of this aspect of the disclosure can include one or more of the following features. The first recess is offset in the vertical direction from the horizontal central axis of the body by a distance removing first recess from intersection with the horizontal central axis of the body. The body defines a second recess, wherein the second recess is positioned opposite the first recess with respect to a horizontal plane passing through the horizontal central axis, the second recess being configured to alternatively receive the beam-like leg member and orient the body in the second position relative to the central axis of the beam-like leg member. The body is axially removable from the beam-like leg member. At least one rest surface is a first rest surface, and the body further defines a second rest surface, and in the second position of the body relative to the central axis of the beam-like leg member, the second rest surface is disposed for supporting engagement upon a support surface. The body is rotatable about the central axis of the beam-like leg member. The beam-like leg member is a horizontal leg of a musical percussion instrument support stand.

In some implementations, the foot element includes a pivot member pivotally mounting the body to the beam-like leg member, wherein the body is pivotable relative to the beam-like leg member between at least the first position of the body relative to the central axis of the beam-like leg member and the second position of the body relative to the central axis of the beam-like leg member. In the second position of the body relative to the central axis of the beam-like leg member, the second rest surface is disposed for supporting engagement upon the support surface.

Implementations can have one or more of the following advantages. For example, by using the musical percussion support stands having height adjustable foot elements as described herein, horizontal (or flat) legs of the support stands can be positioned closely together, or even in overlapping relationship, without obstructing the position or orientation of adjacent support stands. This improvement is achieved by quickly and easily offsetting the height adjustable foot elements of one percussion stand relative to those of another, adjacent stand. This added flexibility in positioning the various components of the drum set can provide a more comfortable and overall better playing experience for a drummer. Using height adjustable foot elements defining one or more multiple recesses can also provide improved vibration dampening characteristics to the percussion support stands on which they are used.

The details of one or more implementations of the disclosure are set forth in the accompanying drawings and the description below. Other aspects, features, and advantages of the disclosure will be apparent from the description and drawings, and from the claims.

DETAILED DESCRIPTION

In the set up and assembly of musical percussion equipment, such as, for example, a drum set, multiple components can be positioned close to one another, e.g., with the horizontal support legs inter-engaged, in order to make it easier for a musician (e.g., a drummer) to have proper playable access to all of the components. As a result, cymbal stands having substantially flat legs positioned horizontally along the floor surface can be elevated with respect to one another by use of height adjustable foot elements so that the legs of adjacent cymbal stands are not on interference.

Figure 1:
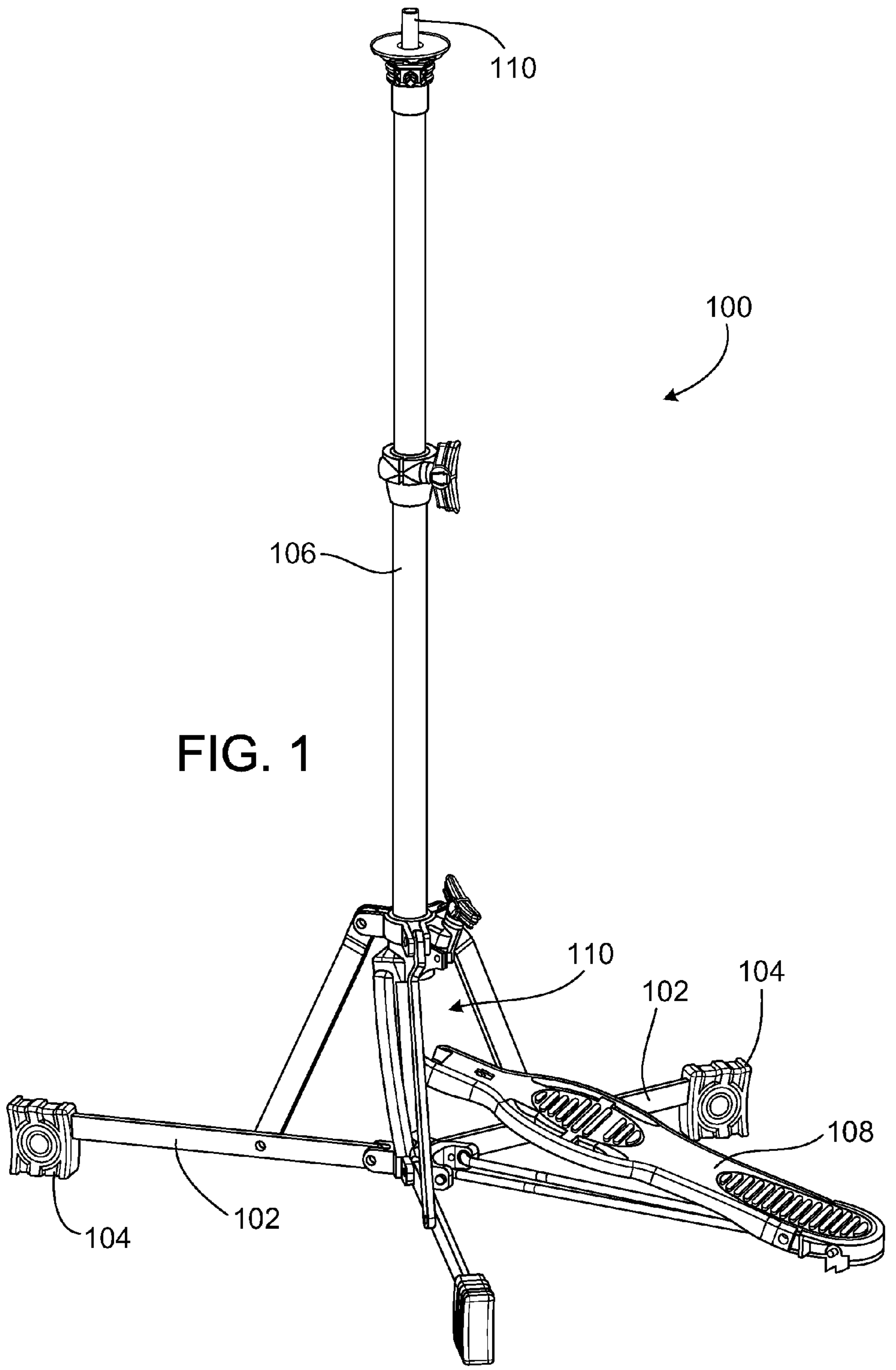
FIG. 1 is a perspective view of a musical percussion support stand positioned on height adjustable foot elements.

FIG. 1 shows a musical percussion support stand (e.g., a hi-hat stand) 100 supported by two or more (e.g., three) horizontally-oriented beam like members (e.g., legs) 102. In an outer region of each leg 102, a height adjustable foot element 104 is arranged to support the stand 100 in place along a supporting surface (e.g., a floor surface). A stand tube 106 extends upwardly from the legs 102 to support a percussion instrument, such as a cymbal (e.g., a hi-hat cymbal). The stand 100 can also include a foot pedal 108 and cymbal linkage 110 to operate a hi-hat style cymbal.

The stand tube 106 is an elongated member that extends upwardly from the legs 102 and supports the cymbals mounted atop the stand 100. As shown in FIG. 1, the stand tube 106 is a hollow tube member through which the cymbal linkage 110 passes to operate the hi-hat cymbal. The pivotable foot pedal 108 is connected to the cymbal linkage 110 and can be depressed to operate the hi-hat cymbal. The stand tube 106 is made from any of suitable materials, for example, plastic, composite, or metal. In some embodiments, such as when the stand 100 is used to support a one-piece cymbal (e.g., a crash cymbal, a ride cymbal, or a similar cymbal), the stand 100 can be constructed without a foot pedal 108 or cymbal linkage 110. In such embodiments, the stand tube 106 can be solid.

The legs 102 are pivotally secured to a lower portion of the stand tube 106 so that they can be moved from an upright stowed position to a deployed position (shown in FIG. 1). In the deployed position, the legs 102 are arranged substantially perpendicular with respect to the stand tube 106. The legs 102 are long enough so that, when in the deployed position, they extend outward from the stand tube 106 to restrict the stand 100 from wobbling or falling during use. To provide proper structural stability, the legs 102 may be typically about 7 inches (17.8 cm) to 12 inches (30.5 cm). The legs 102 have a rectangular cross-sectional profile that is about 0.125 inch (3.2 mm) to about 0.25 inch (6.4 mm) (e.g., 0.190 inch (4.8 mm) high by about 0.5 inch (12.7 mm) to about 0.875 inch (22.2 mm) (e.g., 0.75 inch (19.1 mm)) wide. In some embodiments, the legs have other cross-sectional profiles (e.g., square, circular, elliptical, or other shapes) and can be solid or hollow. The legs 102 are made from any of various structurally suitable materials, such as, for example, plastic, composite, or metal.

A height adjustable foot element 104 is disposed at the end of each leg 102 in an axially offset manner so that the spacing of each leg 102 above a supporting floor surface can be adjusted. Although the height adjustable foot elements 104 are shown as being disposed at the end of each leg 102, in some embodiments, the leg 102 passes through the height adjustable foot element 104.

Figure 2:
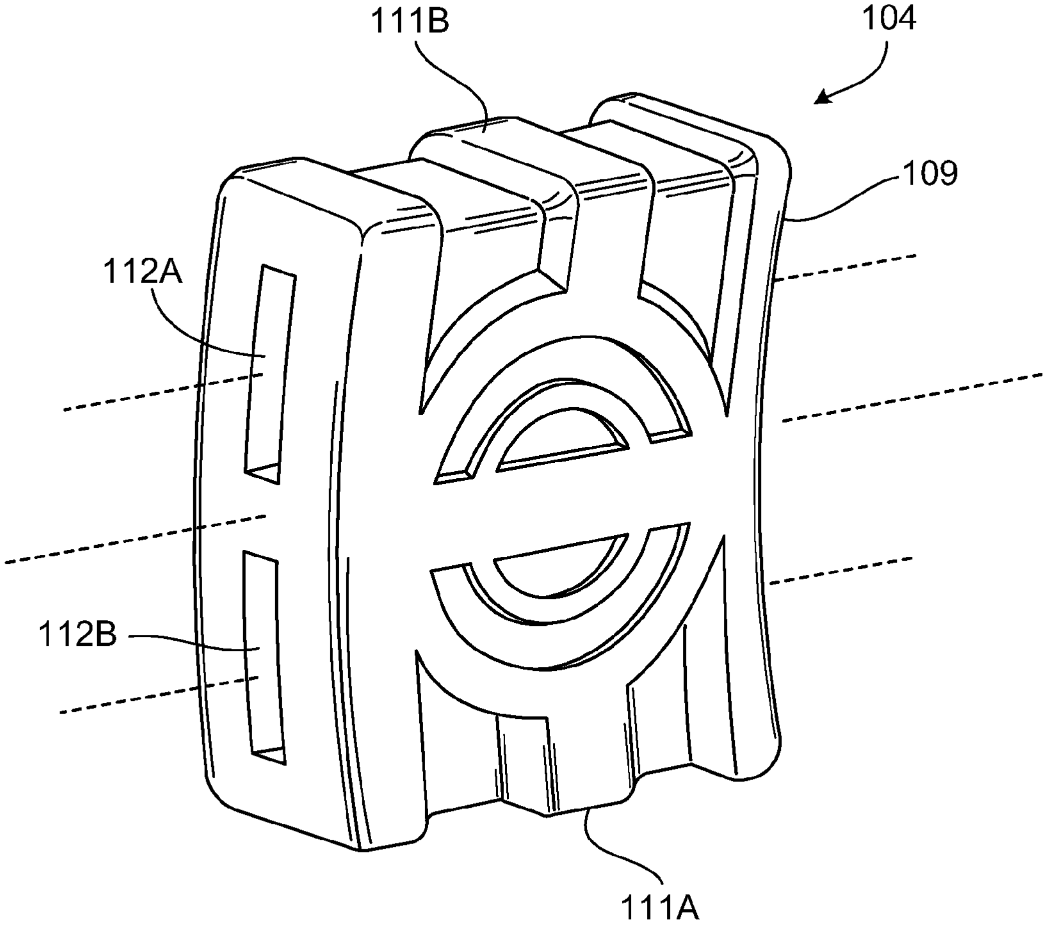
FIG. 2 is a perspective view of a height adjustable foot element.

As shown in FIG. 2, the height adjustable foot element 104 includes a body 109 that defines at least one rest surface 111 and at least a first recess 112A. The first recess 112A is sized and configured to receive the leg 102. Typically, the legs 102 fit into the first recess 112A with a friction fit so that the height adjustable foot element 104 can be adjusted on the leg 102, using various techniques discussed below, by hand without excessive effort, but remain in generally fixed position during normal use.

The first recess 112A is defined within the body 109 so that a central axis of the first recess 112A is substantially parallel to a horizontal central axis of the body 109. The first recess 112A is offset axially, i.e., in a vertical direction, from the horizontal central axis of the body 109. The first recess 112A is offset vertically by a distance that is large enough so that when the height adjustable foot element 104 is adjusted from a lowered configuration to an elevated configuration, the difference in spacing of the leg 102 above the floor surface is typically at least as great as the height of leg 102 itself. In some embodiments, the first recess 112A is offset vertically from the horizontal central axis of the leg 102 by a distance sufficient to remove the first recess 112A from intersection with the horizontal central axis of the body 109. By way of example only, to accommodate a leg 102 having a cross-sectional profile that is about 0.1875 inch (4.8 mm) wide by about 0.75 inch (19.1 mm) high, the body 109 may be about 0.625 inch (15.9 mm) to about 1 inch (25.4 mm) (e.g., 0.75 inch (19.1 mm) wide by about 1.75 inches (44.5 mm) to about 2.5 inches (63.6 mm) (e.g., 2.0 inches (50.8 mm)) high by about 1 inch (25.4 mm) to about 2.5 inches (63.6 mm) (e.g., 1.6 inches (40.6 mm)) deep.

The height adjustable foot elements 104 are designed to support the weight of the stand 100 and any components secured to the stand 100. Again, only by way of example, the three height adjustable foot elements 104 can typically support a total weight of about 10 lbs. (22 kg) to about 50 lbs. (110 kg).

The height adjustable foot element 104 may be made from any of various materials that have suitable structural properties. For example, the height adjustable foot elements 104 can be can be made from plastic (e.g., Acrylonitrile butadiene styrene (ABS), Polyethylene (PE), or Polycarbonate (PC)), rubber (e.g., Nitrile, butyl, or latex), or other suitable material. By using soft plastic or rubber, the height adjustable foot element 104 can resist skidding or sliding of the stand 100 along a floor surface during use. Additionally, using such materials can have vibration and sound dampening effects during use. Height adjustable foot elements with more than one recess 112 can further improve the vibration and sound dampening characteristics of the height adjustable foot element 104. However, in some implementations, the height adjustable foot element 104 may define only a single recess 112 positioned offset from a vertical centerline of the height adjustable foot element 104.

In some implementations, as shown in FIG. 2, the body 109 defines a second recess 112B. The second recess 112B is positioned substantially opposite the first recess 112A with respect to a horizontal plane that passes through the horizontal central axis. The second recess 112B is shaped substantially the same as the first recess 112A and is configured to alternatively receive the leg 102 in order to change the height of the stand 100.

In order to raise and lower the musical percussion support stand 100, the height adjustable foot elements 104 and body 109 can be oriented in various positions with respect to the legs 102. During use, the body 109 can be oriented in a first position relative to a central axis of the leg 102 on which it is disposed. In the first position, the leg 102 is relatively elevated from a supporting surface (e.g., a floor surface) on which the body 109 is disposed. When in the first position relative to the leg 102, a first rest surface 111A is disposed along the floor surface to support the percussion support stand 100.

The body 109 can also be positioned in a second position relative to the central axis of the leg 102. When the body 109 is in the second position relative to the central axis of the leg 102, the leg 102 is relatively closer to (i.e. less spaced from) the floor surface than when the body 109 is in the first position, to lower the percussion support stand 100.

Figure 3A:
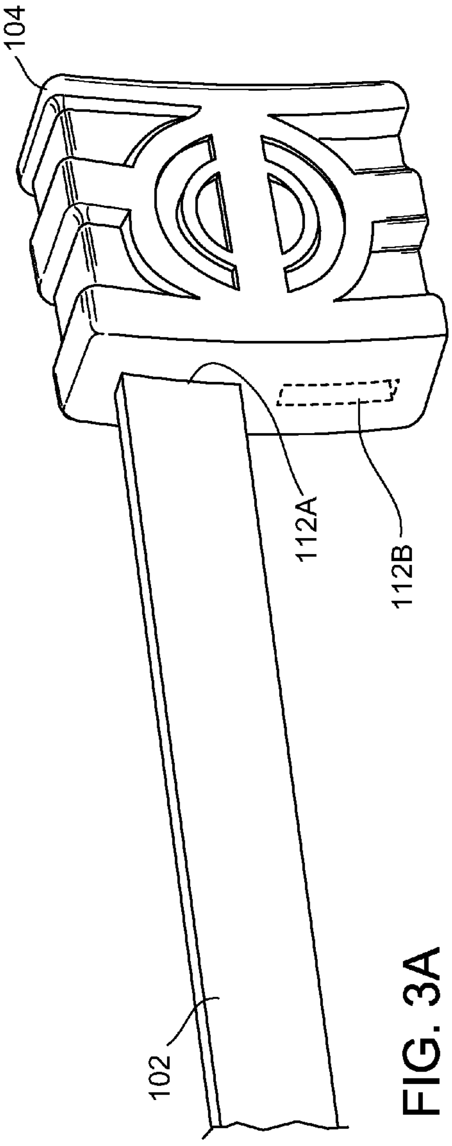
FIGS. 3A and 3B are perspective views of one implementation of a height adjustable foot element being removed along a longitudinal axis of a leg of a musical percussion support stand and then reinstalled, e.g. in another aperture or after rotation, to lower (or to elevate) the leg of the support stand from a floor surface.
Figure 3B:
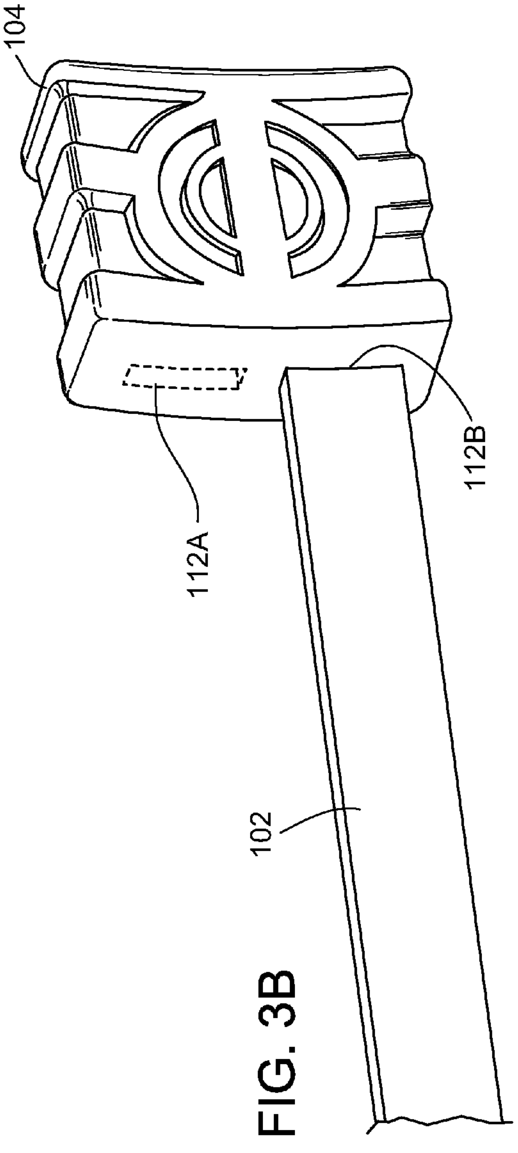

Referring to FIGS. 3A and 3B, in some implementations, to move the body 109 from the first position (e.g., an elevated configuration) to the second position (e.g., a lowered configuration), or vice versa, the body 109 is axially removable from leg 102. To move the body 109 from the first position to the second position, the body 109 can be removed (e.g., pulled) from the leg 102 to remove the leg 102 from the first recess 112A (e.g., the upper recess) and then pushed onto the leg 102 so that the leg 102 is inserted into the second recess 112B (e.g., the lower recess). By moving all of the legs 102 of the stand 100 from the first recesses 112A to second recesses 112B of the respective height adjustable foot elements 104, the entire stand 100 is lowered so that the horizontal legs 102 are closer to the floor surface than they would be if each body 109 were in the first position with respect to the legs 102.

Figure 4:
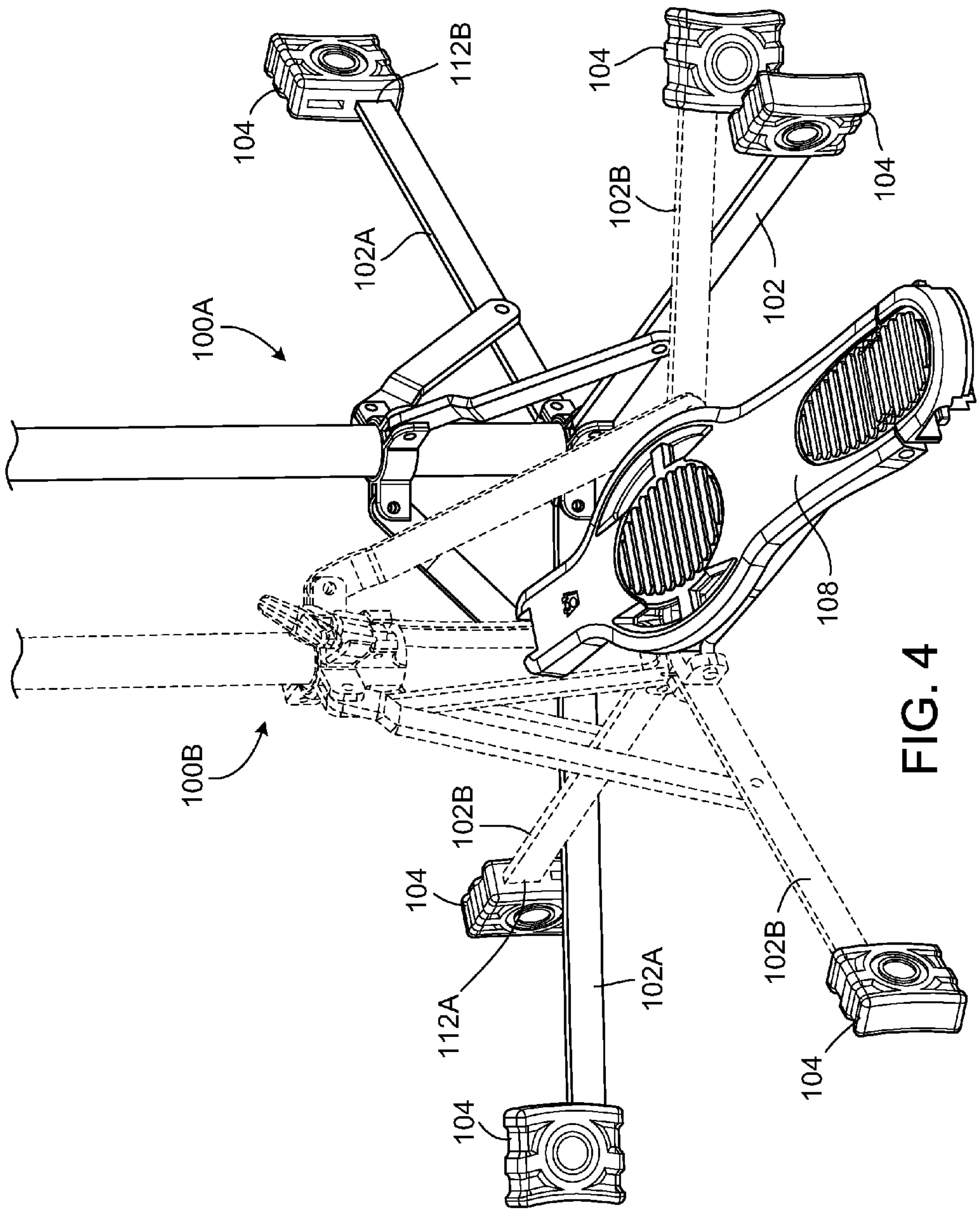
FIG. 4 is a perspective view of two musical percussion support stands positioned close to one another, where the heights of the respective support stands (relative to a floor or other supporting surface) are adjusted using the height adjustable foot element of FIG. 2.

FIG. 4 shows an example of adjusting the leg height of musical percussion support stands 100A, 100B using the height adjustable foot elements 104 discussed above. As shown, a lowered cymbal stand 100A is positioned closely next to an elevated hi-hat stand 100B (shown in dashed lines). Each of the legs 102A of the lowered cymbal stand 100A are inserted into the lower recesses 112 of the respective height adjustable foot elements 104, placing the leg relatively closer to the floor. This configuration results the height adjustable foot elements 104 of the lowered cymbal stand 100A being in the second position with respect to the legs 102A and the legs 102A of the lowered cymbal stand 100A being positioned relatively closer to the floor surface.

Each of the legs 102B of the elevated hi-hat stand 100B are inserted into the first recesses 112A of the respective height adjustable foot elements 104. Inserting the legs 102B into the first recesses 112A of the height adjustable foot elements 104 places the height adjustable foot elements 104 in the first position with respect to the legs 102B. This causes the legs 102B to be elevated from the floor surface by a distance sufficient to allow the legs 102A of the lowered cymbal stand 100A to pass between the floor surface and the elevated legs 102B without obstruction or collision. As a result, the cymbal stand 100A and the hi-hat stand 100B can be positioned close to each other and oriented as desired to provide a better playing experience for a drummer.

Alternatively, instead of necessitating complete removal of the height adjustable foot elements 104 from the legs 102 to adjust the position of the legs 102, other techniques can be used. For example, in some implementations, the body 109 includes more than one rest surface that can be disposed on a floor surface to support the stand 100, allowing other techniques for moving the body 109 between the first position and the second position relative to the leg 102. In some embodiments, when the body 109 is oriented in the second position relative to the leg 102, a second rest surface 111B is disposed along the floor surface for supporting the stand 100.

Figure 5:
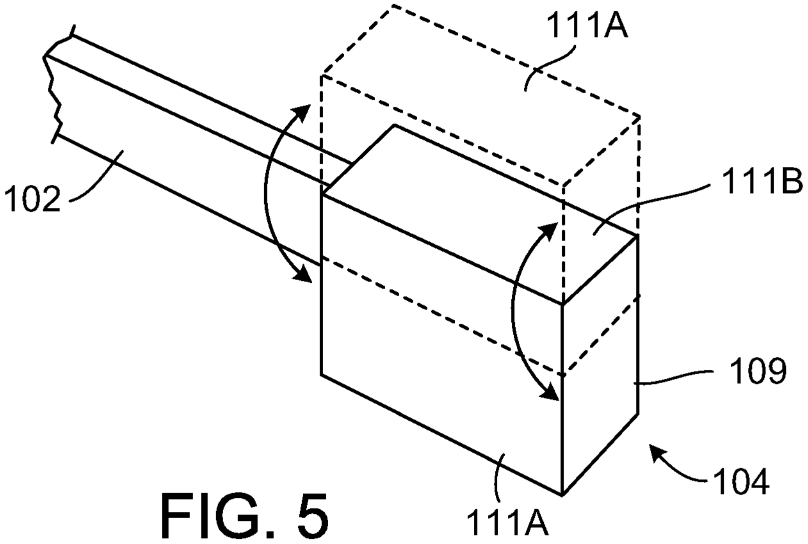
FIG. 5 is a perspective view of another implementation of a height adjustable foot element being rotated about a longitudinal axis of a leg of a musical percussion support stand to elevate (or lower) the leg of the support stand from a floor surface.

For example, as shown in FIG. 5, the body 109 is sufficiently flexible to allow rotation about a longitudinal axis of the leg 102. Since the leg 102 is disposed in the offset recess 112 of the body 109, the spacing between the leg 102 and the floor surface changes when the body 109 is rotated about the offset leg 102. Alternatively, in cases where the leg 102 is round, a relatively more rigid body 109 can permit rotation to adjust the height of the stand.

Figure 6:
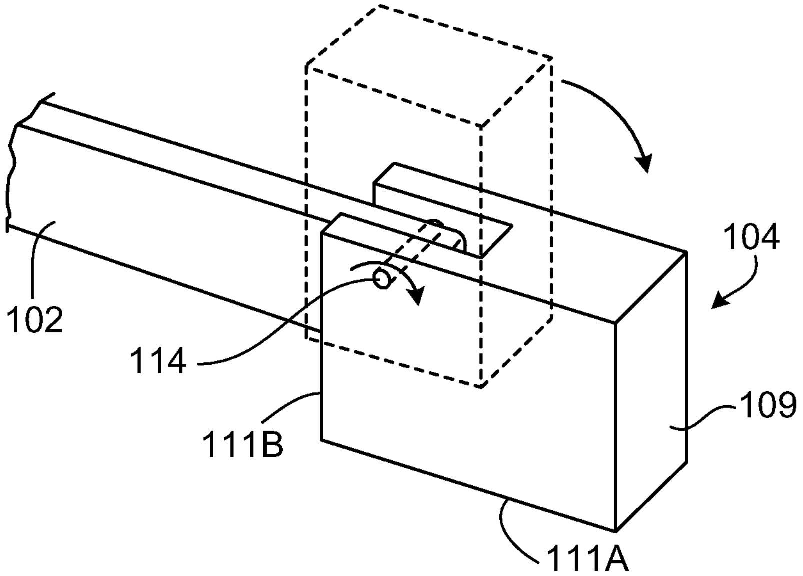
FIG. 6 is a perspective view of yet another implementation of a height adjustable foot element being pivoted to elevate (or lower) a leg of a support stand from a floor surface.

Although the body 109 has been described as defining one or more recesses 112 to receive and retain a leg 102 in a press-fit manner, other techniques for height adjustment are possible. For example, as shown in FIG. 6, in some implementations, the body 109 is fastened to the leg 102 in a pivotable manner. As shown, in such embodiments, the body 109 may be fastened using a pin 114 mounted in an offset location both vertically and horizontally in order to pivotally secure the body 109 to the leg 102.

To raise the height of the leg 102, the height adjustable foot element 104 can simply be pivoted with respect to a central axis of the pivot pin 114 between at least the first position of the body 109 relative to the leg 102 and the second position.

When in the second position, the second rest surface 111B is disposed for engagement with the floor surface to support the stand 100. The body 109 and/or the leg 102 can also include a position retention member (e.g., detents, a clip, or other suitable device) to retain the height adjustable foot element 104 in a desired orientation.

Although the body 109 has been described as being substantially rectangular, other shapes can achieve various structural and/or aesthetic design goals. For example, in some implementations, the body 109 has cross-sectional profiles formed of other shapes, such as, polygons (e.g., triangles, pentagons, hexagons, or other polygons), star shapes, circular or elliptical shapes, or other shapes.

Although the height adjustable foot elements 104 have been described as being used to adjust the height of cymbals, other types of percussion equipment, such as, for example, drums (e.g., snare drums, tom toms, congas or bongos, or other drums), or other pieces of floor-mounted percussion equipment can be supported and adjusted using height adjustable foot elements. Further, height adjustable foot elements can be used to support and position other types of equipment, e.g., other musical equipment.

Figure 7A:
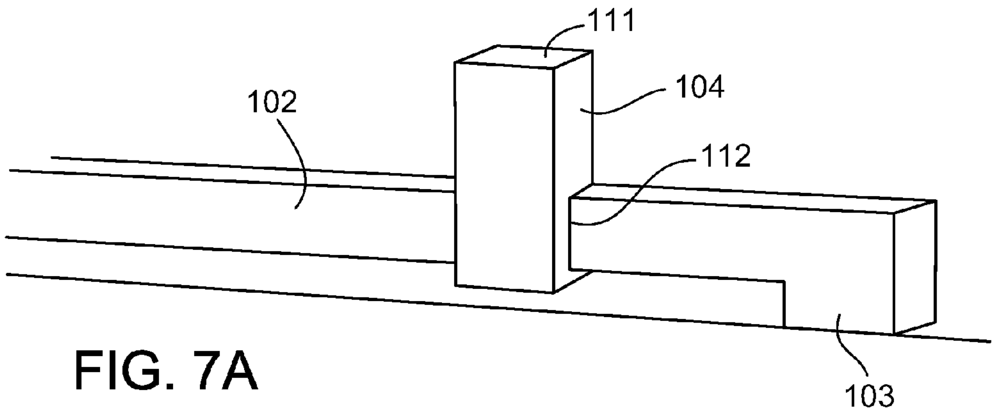
FIGS. 7A and 7B are perspective views of another implementation of a height adjustable foot element being rotated about a longitudinal axis of a leg of a musical percussion support stand to elevate (or lower) the leg of the support stand from a floor surface. The leg is alternatively supported on the floor surface by the height adjustable foot element and a portion of the leg itself.
Figure 7B:
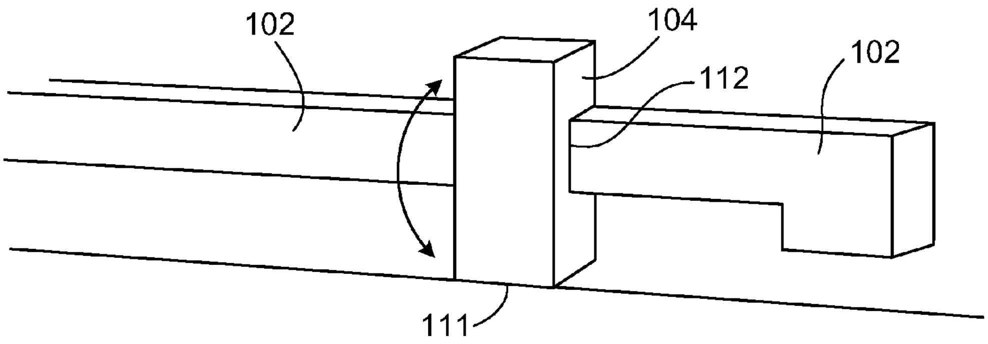

A number of implementations have been described. For example, referring to FIGS. 7A and 7B, for use with a musical percussion stand having horizontal or flat legs 102 spaced from the floor on fixed feet 103, the height adjustable foot element 104 may be adjustable relative to the leg 102, e.g. by rotation or sliding, and engagable with the floor or supporting surface only in the elevated state, and with only a single rest surface 111. As shown, when the height adjustable foot element 104 is adjusted so that the rest surface 111 is not disposed along the floor or supporting surface, the fixed foot element is disposed for supporting engagement of the stand upon a support surface.

It will be understood further that various modifications may be made without departing from the spirit and scope of the disclosure. Accordingly, other implementations are within the scope of the following claims.

What is claimed is:

1. A musical percussion support stand comprising:
- a stand tube;
- two or more legs pivotally secured to a lower portion of the stand tube and configured to be deployed generally perpendicular to the stand tube in supporting relationship; and
- a set of a least two height adjustable foot elements, each height adjustable foot element comprising:
  - a body defining at least one rest surface; and
  - at least a first recess defined by the body,
    - the first recess being configured to receive an endward region of one of the legs; and
    - a central axis of the first recess being substantially parallel to a horizontal central axis of the body,
- the body having a first position relative to a central axis of the leg, wherein the at least one rest surface is disposed for supporting engagement of the stand upon a supporting surface;
- the body having a second position relative to the central axis of the leg; and
- in the first position of the body relative to the central axis of the leg, the leg is relatively more spaced from the supporting surface than in the second position of the body relative to the central axis of the leg.

2. The musical percussion support stand according to claim 1, wherein the first recess is offset in the vertical direction from the horizontal central axis of the body by a distance removing the first recess from intersection with the horizontal central axis of the body.

3. The musical percussion support stand according to claim 1, further comprising a second recess defined by the body, wherein the second recess is positioned opposite the first recess with respect to a horizontal plane that passes through the horizontal central axis, the second recess being configured to alternatively receive the leg and orient the body in the second position relative to the central axis of the leg.

4. The musical percussion support stand according to claim 1, wherein each height adjustable foot element is axially removable from a corresponding leg.

5. The musical percussion support stand according to claim 1, wherein the at least one rest surface is a first rest surface, the body further defines a second rest surface, and in the second position of the body relative to the central axis of the leg, the second rest surface is disposed for supporting engagement of the stand upon a support surface.

6. The musical percussion support stand according to claim 5, further comprising a pivot member pivotally mounting the body to the leg, wherein the body can pivot with respect to the leg between at least the first position of the body relative to the central axis of the leg and the second position of the body relative to the central axis of the leg, and in the second position of the body relative to the central axis of the leg, the second rest surface is disposed for supporting engagement upon the support surface.

7. The musical percussion support stand according to claim 5, wherein each height adjustable foot element is rotatable about the central axis of a corresponding leg.

8. The musical percussion support stand according to claim 1, wherein each leg comprises a fixed foot element extending from a lower surface of the leg and defining a foot surface, and in the first position of the body relative to the leg, the rest surface of the body is disposed in supporting engagement of the stand upon the supporting surface and the foot surface of the fixed foot element is removed from contact with the supporting surface, and in the second position of the body relative to the leg, the rest surface of the body is removed from contact with the supporting surface and the foot surface of the of the fixed foot element is disposed in supporting engagement of the stand upon the supporting surface.

9. A height adjustable foot element comprising:
- a body defining at least one rest surface; and
- at least a first recess defined by the body,
  - the first recess being configured to receive a beam-like leg member; and
  - a central axis of the first recess being substantially parallel to a horizontal central axis of the body,
- the body having a first position relative to a central axis of the beam-like leg member, wherein the at least one rest surface is disposed for supporting engagement upon a supporting surface;
- the body having a second position relative to the central axis of the beam-like leg member; and
- in the first position of the body relative to the central axis of the beam-like leg member, the beam-like leg member is relatively more spaced above the supporting surface than in the second position of the body relative to the beam-like leg member.

10. The height adjustable foot element according to claim 9, wherein, the first recess is offset in the vertical direction from the horizontal central axis of the body by a distance removing first recess from intersection with the horizontal central axis of the body.

11. The height adjustable foot element according to claim 9, further comprising a second recess defined by the body, wherein the second recess is positioned opposite the first recess with respect to a horizontal plane passing through the horizontal central axis, the second recess being configured to alternatively receive the beam-like leg member and orient the body in the second position relative to the central axis of the beam-like leg member.

12. The height adjustable foot element according to claim 9, wherein the body is axially removable from the beam-like leg member.

13. The height adjustable foot element according to claim 9, wherein the at least one rest surface is a first rest surface, and the body further defines a second rest surface, and in the second position of the body relative to the central axis of the beam-like leg member, the second rest surface is disposed for supporting engagement upon a support surface.

14. The height adjustable foot element according to claim 13, wherein the body is rotatable about the central axis of the beam-like leg member.

15. The height adjustable foot element according to claim 13, further comprising a pivot member pivotally mounting the body to the beam-like leg member, wherein the body is pivotable relative to the beam-like leg member between at least the first position of the body relative to the central axis of the beam-like leg member and the second position of the body relative to the central axis of the beam-like leg member, and in the second position of the body relative to the central axis of the beam-like leg member, the second rest surface is disposed for supporting engagement upon the support surface.

16. The height adjustable foot element according to claim 9, wherein the beamlike leg member is a horizontal leg of a musical percussion instrument support stand.

* * * * *

UNITED STATES PATENT AND TRADEMARK OFFICE

CERTIFICATE OF CORRECTION

PATENT NO. : 9,245,503 B2
APPLICATION NO. : 14/355098
DATED : January 26, 2016
INVENTOR(S) : Joshua Allen It is certified that error appears in the above-identified patent and that said Letters Patent is hereby corrected as shown below:

Claims

Col. 7, line 48, Claim 1, delete “a least” and insert -- at least --, therefor.

Col. 8, line 42, Claim 8, delete “of the of the” and insert -- of the --, therefor.

Signed and Sealed this
Twenty-sixth Day of April, 2016

Michelle K. Lee
*Director of the United States Patent and Trademark Office*